Aug. 12, 1958  L. F. MARKS ET AL  2,846,800
FRAME FOR MIRROR IN TRAIN CASE

Filed Dec. 4, 1956  2 Sheets-Sheet 1

INVENTORS.
LOU F. MARX, and
LEONARD LOUIK.
BY
Brown, Critchlow, Flick & Peckham
their
ATTORNEYS.

Aug. 12, 1958  L. F. MARKS ET AL  2,846,800
FRAME FOR MIRROR IN TRAIN CASE
Filed Dec. 4, 1956  2 Sheets-Sheet 2

INVENTORS.
LOU F. MARX, and
LEONARD LOUIK.
BY
Brown, Critchlow, Flick & Peckham
their ATTORNEYS.

2,846,800
FRAME FOR MIRROR IN TRAIN CASE

Lou F. Marks and Leonard Louik, Pittsburgh, Pa., assignors to Bruce Molded Plastics Products, Inc., Pittsburgh, Pa., a corporation of Pennsylvania Application December 4, 1956, Serial No. 626,208

4 Claims. (Cl. 40—152)

This invention relates to mirror frames, and more particularly to a frame for a mirror mounted in the cover of a woman's train case.

It is among the objects of this invention to provide a mirror frame which is molded in one piece from a synthetic plastic, which holds a mirror securely, which can be mounted in a train case cover by merely pressing the frame into the cover, which protects the mirror from breakage due to impacts against the cover, and which can readily be made in any desired color.

In accordance with this invention the frame is molded from a plastic and has a generally rectangular body that is formed to hold a mirror. The body is surrounded by a flexible lip that flares forward from it. The lip is adapted to be contracted by the side wall of the cover of a train case when the frame is pressed into the cover, whereby the lip will tightly engage the wall of the cover and fit snugly in it. Preferably, the mirror is mounted in a rabbet surrounding the back of the mirror opening in the frame and is held therein by flanges projecting from the outer walls of the rabbet inward over the marginal area of the mirror. Projections from the back of the frame space it a short distance from the top wall of the cover to protect the mirror from breakage.

The preferred embodiment of the invention is illustrated in the accompanying drawings, in which—

Figure 1:
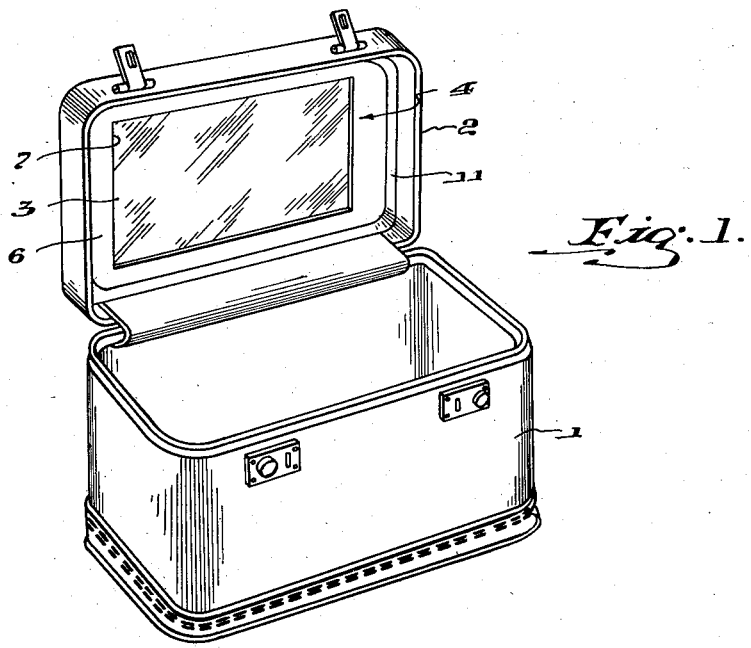
Fig. 1 is a perspective view of an open train case, showing my mirror frame mounted in the cover.
Figure 2:
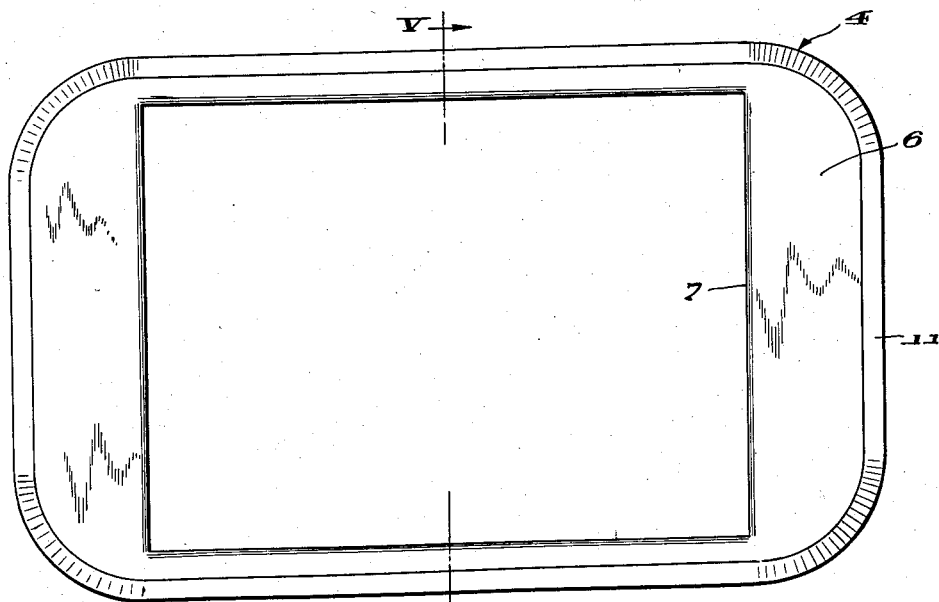
Fig. 2 is an enlarged front view of the frame only.

Referring to Fig. 1 of the drawings, a small box-like traveling case, generally referred to as a woman's train case, has a deep bottom portion 1 and a hinged shallow cover 2. In most cases the corners of the case are gently rounded, whereby the side wall of the cover is of generally rectangular shape with curved corners. Mounted in the cover is a rectangular mirror 3, which is held in place by a frame 4.

According to this invention the frame is made in one piece by molding a synthetic plastic, such as polyethylene, into the desired shape. The color of the plastic is chosen to match or look well with the color of the lining of the case. The frame is stiff enough to hold its shape, but it can be flexed readily when desired. The flat body 6 of the frame has a generally rectangular shape with rounded corners, and is nearly as large as the inside of the cover. The central opening 7 in the frame, through which the mirror is seen, is preferably rectangular because the frame is designed to receive a rectangular mirror which is the least expensive shape. Due to the curved corners of the frame, the areas of the body at its opposite ends are rather wide and form end panels of pleasing appearance.

Figure 3:
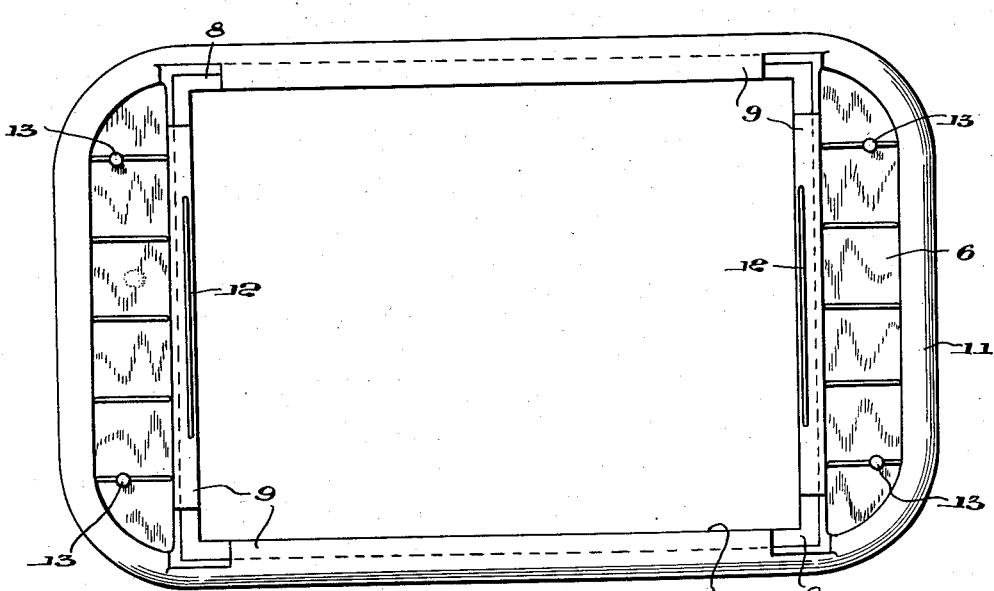
Fig. 3 is a rear view thereof.
Figure 4:
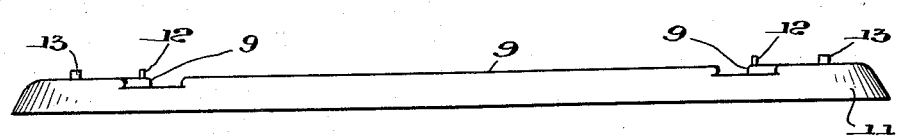
Fig. 4 is a side view.

To position the mirror in the frame, the back of it around its central opening is provided with a rabbet 8 that has parallel sides and ends, as shown in Fig. 3. The marginal area of the mirror fits snugly in the rabbet and is held in place by integral flanges 9 projecting from the outer walls of the rabbet inward across it in engagement with the back of the mirror. The ends of the flanges are spaced far enough from the corners of the rabbet to permit opposite edges of the mirror to be inserted in one end of the grooves formed between a pair of flanges 9 and the front wall of the rabbet, and then slid lengthwise of those flanges until the mirror is in place. The flanges and the frame in general will flex sufficiently to allow that operation. The flange at the trailing edge of the mirror can be bent out far enough to permit it to be slipped over that edge when the mirror reaches final position.

Figure 5:
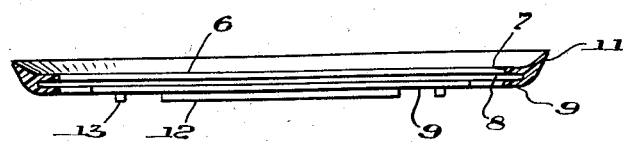
Fig. 5 is a cross section taken on the line V—V of Fig. 2.

Another feature of the invention is that the body of the frame is surrounded by a flexible lip 11 that flares forward from the body. As shown in Fig. 5, the lip is tapered in cross section toward its outer edge. It is heavy enough to retain its shape, but thin enough to permit it to be bent inward or contracted when a moderate amount of pressure is applied to its outer surface. The circumference of the front or outer edge of the lip is greater than the circumference of the inside of the side wall of the case cover. As a result, when the frame with the mirror mounted in it is pushed into the cover, the lip will be contracted by the side wall of the cover. The frame is pressed into the cover until it is stopped by the cover's top wall. The lip, being bent inward by the side wall of the cover, will tightly engage that cover so that the frame will fit snugly and generally be held in place by friction. The sharp edge of the lip makes a neat joint with the side wall of the cover. The lip may also engage the cover tightly enough to form a seal, so that the frame and mirror are held in place by suction behind them if they attempt to move forward.

To help prevent the mirror from being broken by impacts against the top of the cover, the body of the frame is spaced from the cover top in order to form a small space between the cover and the back of the mirror. For this purpose, at least the two end flanges 9 are provided with rearwardly directed projections, such as ribs 12, which will engage the top of the cover. Also and for the same reason, it is desirable to provide the back of the end panels of the frame body with rearwardly extending bosses 13, which also engage the top of the cover.

The mirror frame disclosed herein can be made very inexpensively in any desired color and quickly mounted in place. Usually, no fastening means are required to hold the frame. A mirror can be readily inserted in the frame, which will protect it from breakage to a large extent.

The frame can also be used for framing glass plates other than reflecting plates and for supporting such a plate in a surrounding enclosure which is not a train case cover. For example, the glass plate may be transparent and supported by the frame in one side of a box or the like to form a window in it.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A molded plastic frame for a glass plate, the frame comprising a generally rectangular body formed to hold a glass plate, and a flexible lip surrounding said body and flaring forward therefrom, the lip being adapted to be contracted by the side wall of a surrounding enclosure when the frame is pressed backward into that enclosure, whereby the frame will fit snugly in the enclosure.

2. A molded plastic frame for a glass plate, the frame comprising a generally rectangular body provided with a large opening surrounded by a rabbet in the back of the body for receiving the marginal area of a rectangular glass plate, flanges projecting from the outer walls of the rabbet inward across the rabbet for overlying said marginal area of the glass plate to hold it in the frame, and a flexible lip surrounding said body and flaring forward therefrom, said lip being tapered in cross section toward its outer edge and adapted to be contracted by the side wall of a surrounding enclosure when the frame is pressed rearwardly into that enclosure.

3. A molded plastic frame for a glass plate, the frame comprising a generally rectangular body provided with a large opening surrounded by a rabbet in the back of the body for receiving the marginal area of a rectangular glass plate, flanges projecting from the outer walls of the rabbet inward across the rabbet for overlying said marginal area of the glass plate to hold it in the frame, at least two opposite flanges being spaced from the corners of said rabbet to facilitate sliding the glass plate lengthwise of said last-mentioned flanges between them and the front wall of the rabbet, and a flexible lip surrounding said body and flaring forward therefrom, said lip being adapted to be contracted by the side wall of a surrounding enclosure when the frame is pressed backward into that enclosure.

4. A molded plastic frame for a glass plate, the frame comprising a generally rectangular body formed to hold a glass plate, a flexible lip surrounding said body and flaring forward therefrom, the lip being adapted to be contracted by the side wall of a surrounding enclosure when the frame is pressed backward into that enclosure, whereby the frame will fit snugly in the enclosure, and spacing projections on the back of the frame extending back a short distance.

References Cited in the file of this patent
UNITED STATES PATENTS

| | | |
|---|---|---|
| 1,181,262 | Schoch et al. | May 2, 1916 |
| 1,610,146 | Panzer | Dec. 7, 1926 |
| 1,638,837 | Deitsch | Aug. 16, 1927 |
| 2,119,314 | Burdge et al. | May 31, 1938 |
| 2,500,897 | Friedman | Mar. 14, 1950 |